W. A. BRUBAKER.
CUSHION TIRE.
APPLICATION FILED DEC. 29, 1921.

1,414,252.  Patented Apr. 25, 1922.

Inventor
William A Brubaker
By F. E. Sherman
Attorney

UNITED STATES PATENT OFFICE.

WILLIAM A. BRUBAKER, OF AKRON, OHIO.

CUSHION TIRE.

,414,252.   Specification of Letters Patent.   Patented Apr. 25, 1922.

Application filed December 29, 1921. Serial No. 525,553.

*To all whom it may concern:*

Be it known that I, WILLIAM A. BRUBAKER, a citizen of the United States, residing at Akron, in the county of Summit and State of Ohio, have invented new and useful Improvements in Cushion Tires, of which the following is a specification.

This invention relates to new and useful improvements in elastic tires for wheels and has particular relation to a new and novel tire of the cushion type especially adapted for use on the wheels of self-propelled vehicles.

Objects of the invention are to provide a strong durable tire which may be manufactured at a low cost and which will provide efficient means for absorbing shocks and jars occasioned by the progress of a vehicle over a rough and uneven surface.

Further objects are to provide a tire having a circumferentially extending series of openings projecting therein from each lateral side thereof so as to provide a tire having a circumferentially arranged, compressible portion which will be subjected to distortion when the tire is under load and to alternately arrange the openings in one side in respect to the openings on the other so that the said portion will be uniformly compressible.

A still further object is to provide a tire having openings arranged therein as above set forth and to provide a centrally positioned circumferentially extending zig-zag solid portion which will be extremely efficient in resisting undue lateral distortion when the tire is subject to an axially directed strain.

The above and additional objects are accomplished by the novel construction, combination and arrangement of parts hereinafter described and illustrated in the accompanying drawing, wherein I have shown a preferred embodiment of the invention, it being understood that the invention is capable of various adaptations and that changes and modifications may be made or substitutions resorted to which come within the scope of the claims hereunto appended.

In the drawings in which similar numerals of reference have been used to denote identical parts as the same appear in the several views and in which:—

Figure 1:
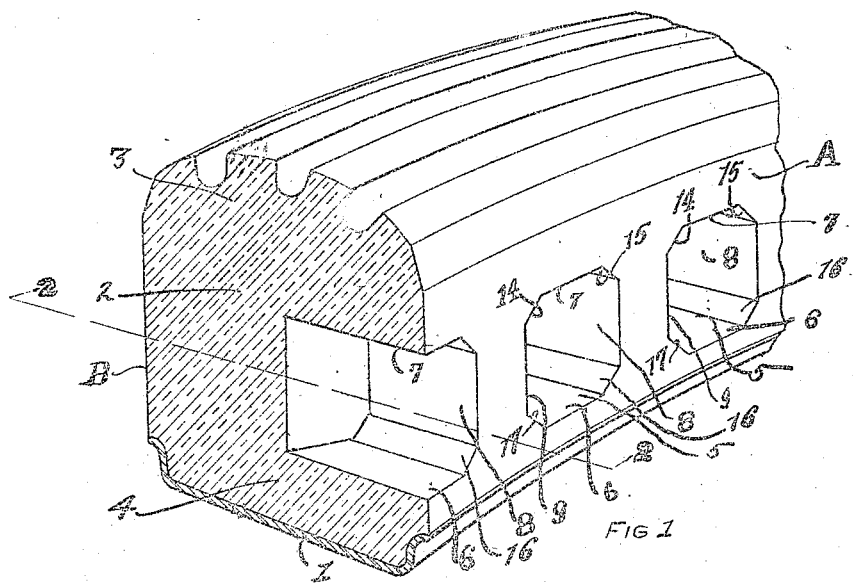
Figure 1 is a perspective view of a portion of a vehicle tire constructed in accordance with this invention and also showing a transverse sectional view taken on line 1—1 of Figure 2.
Figure 2:
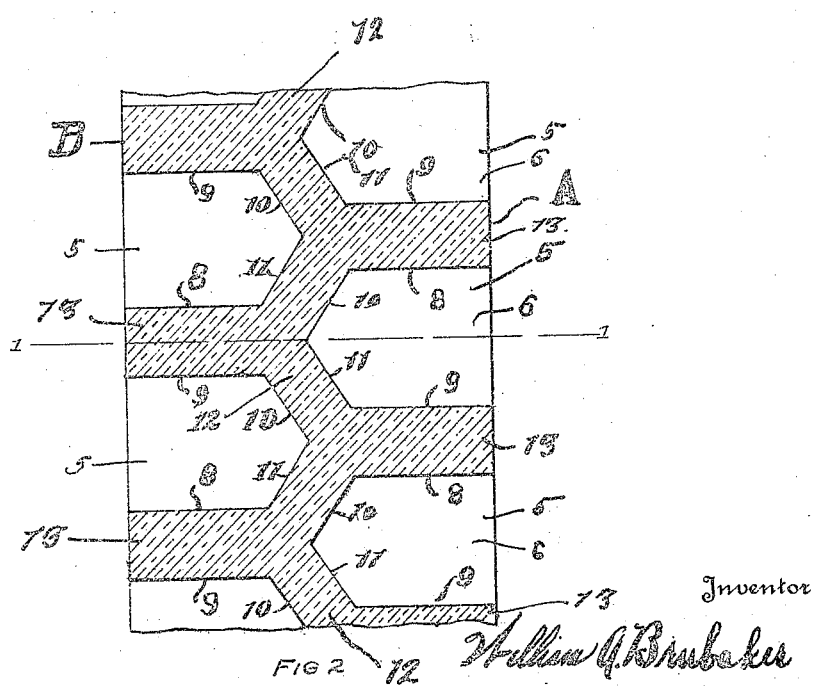
Figure 2 is a horizontal, sectional view of same taken as indicated by the line 2—2 of Figure 1.

In the drawings the numeral 1 is used to denote a tire rim to which is vulcanized or otherwise suitably secured an annular elastic tire body 2. The numeral 3 is used to denote the peripheral or tread portion of the tire and the numeral 4 the base or portion of the tire lying adjacent the rim 1. The tire body is provided on each lateral side with a circumferentially extending series of regularly recurring holes 5 which project into the tire body in parallel relation to the axis of the tire to a point approximately central thereof. The holes 5 in one side of the tire are alternately disposed in relation to the holes in the other side thereof. The holes 5 are preferably polygonal in cross sectional contour and each hole is provided with the inner wall 6 and the outer wall 7, which are disposed in parallel spaced relation at a right angle to a radius of the tire passing through the center of the opening. While each hole 5 is eight sided, it is substantially rectangular in cross sectional contour being provided with the walls 6, 7, 8 and 9 which are rectangularly arranged in relation to each other. Each hole 5 is further provided with the relatively narrow walls 14, 15, 16 and 17 which are rectangularly arranged in relation to each other and are alternately disposed in relation to the walls 6, 7, 8 and 9. Each opening 5 is provided at its inner projecting end with the end walls 10 and 11 which meet along a line positioned centrally of the tire body and running with the radius of the tire.

The wall 10 intersects the wall 8 at an obtuse angle and the wall 11 likewise intersects the wall 9 at a similar angle. Each of the walls 10 and 11 are parallelly disposed in relation to an end wall of a similar recess in the other side of the tire. The end wall 10 of each hole or recess 5 in the side A of said tire is thus disposed in parallel spaced relation to the end wall 11 of a recess 5 in the other side B and the end wall 11 of said recess is disposed in parallel spaced relation to a wall 10 of a different recess on the side B. A centrally positioned, circumferentially extending, zig-zag solid portion is thus formed, which for the purpose of this description has been designated by the numeral 12 and a rectangularly block-like portion 13 is thus formed between adjacent recesses. The portions 13 extend inwardly to the central portion 12 and are alternately disposed relative to a similar portion on the other side of the tire.

It will thus be seen that I have provided a tire structure having arranged therein a circumferentially extending series of recesses 5 which alternately project therein from each lateral side thereof so as to form a center portion provided with a circumferentially extending series of regularly recurring sharp angles or turns and that the portions 13 extend from alternate angles in said center portion 12 to opposite sides of the tire.

The portions 13 between the recesses 5 form blocks, each of which is relatively wider at its point of juncture with the inner and outer portions of the tire body. The design and arrangement of the recesses or holes 5 provide a compressible portion which extends laterally and circumferentially of the tire and forms an area of compressibility which is very efficient in withstanding both longitudinal and lateral strains.

Having thus illustrated my invention and described the same in detail, what I claim as new and desire to secure by Letters-Patent is:—

1. A cushion tire comprising an annular elastic body provided on each lateral side with a circumferentially extending series of recesses which project into the tire body to a point approximately central thereof, each recess being provided at its inner end with two walls which meet at an angle along a line running with a radius of the tire and each of said walls being disposed in parallel relation to a similar wall of one of the recesses on the other side of the tire.

2. A cushion tire comprising an annular elastic body provided on each lateral side with recesses which project therein to a point approximately central thereof in parallel spaced relation to the axis of the tire, the recesses on one side of the tire being alternately arranged in respect to the recesses on the other side thereof and each recess provided at its inner end with walls which intersect along a line running with a radius of the tire, said recesses being arranged to provide a solid portion which extends in a series of sharp turns circumferentially of the tire.

3. A tire comprising an annular elastic body having a plurality of holes in each of its sides, each of said holes having parallel side walls which terminate in spaced relation to the center of the tire body and each being provided with two end walls which are disposed at an angle to said side walls and at an angle to each other so as to intersect along a line running with a radius of the tire.

4. A tire comprising an annular elastic body having a plurality of holes in each of its sides, each of said holes being of uniform cross-sectional contour and extending into the tire body in parallel relation to the axis thereof, each hole provided at the inner end thereof with walls which are disposed at an angle to the axis of the tire and intersect along a line running with a radius of the tire.

5. A tire comprising an annular elastic body having a plurality of holes in each of its sides, each of said holes being of uniform cross-sectional contour and extending into the tire body in parallel relation to the axis thereof, each hole provided at the inner end thereof with walls which are disposed at an angle to the axis of the tire and intersect along a line running with a radius of the tire, each of said end walls being disposed in spaced parallel relation to an end wall of a similar opening on the other side of the tire.

6. In a cushion tire, an annular elastic body including a solid base portion and a solid tread portion and a compressible center portion concentrically arranged therebetween, said central portion disposed in a series of sharp angles forming a plurality of alternately disposed oblique truss members and provided with laterally directed truss members which extend alternately from each angle in said central portion to opposite sides of the tire.

In testimony whereof I have hereunto set my hand.

WILLIAM A. BRUBAKER.